United States Patent Office 2,725,485
Patented Nov. 29, 1955

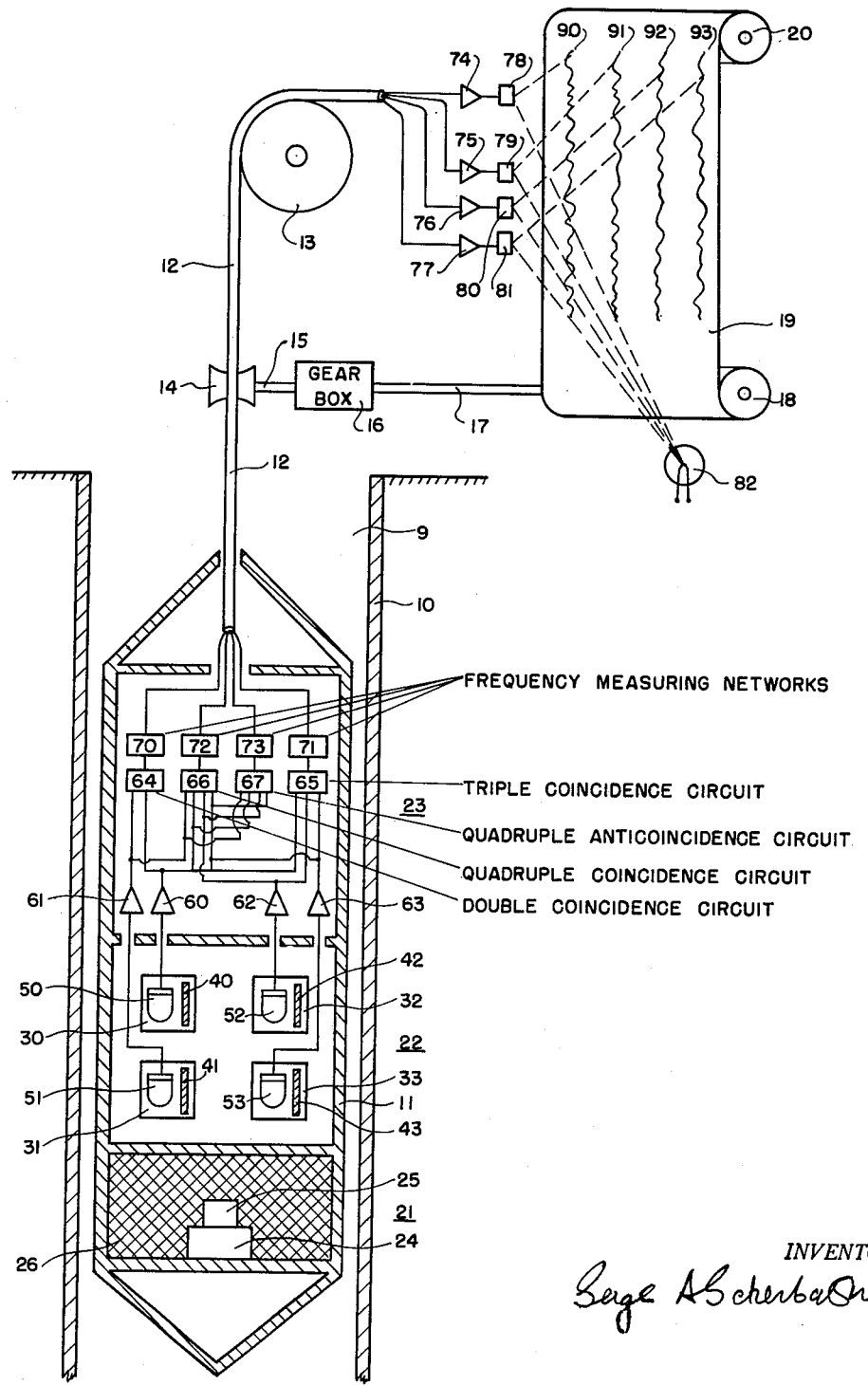

2,725,485

RADIOACTIVITY WELL LOGGING

Serge A. Scherbatskoy, Tulsa, Okla., assignor to Perforating Guns Atlas Corporation, Houston, Tex., a corporation of Delaware Application August 3, 1951, Serial No. 240,158

10 Claims. (Cl. 250—71.5)

This invention is concerned with a method and apparatus for performing in a bore hole measurements of radiation resulting from nuclear transformations being caused by an external source, such as a source of neutrons placed adjacent to said formations in the neighborhood of a detecting instrument.

Many measurements have been made of above radiations and particularly gamma radiations. These gamma radiations usually result from naturally radioactive substances present in the formations or from the effect of irradiations of the formations with a stream of neutrons. The measurement of these radiations has been found useful in geophysical prospecting and in many instances the measurement of the radiations obtained from a geological structure or sample taken from that structure has yielded valuable information as to the nature of the structure. Thus, to cite one specific example, ionization chamber, either alone or accompanied with a source of neutrons, has been lowered into a bore hole in the earth and measurements were made at various levels of gamma radiations derived from the formations. These measurements when correlated with measurements of the depth at which they were taken have shown accurately the interfaces between the various strata and have even given good indications of the nature of particular strata.

It is not always sufficient, however, to have merely a measurement of the total gamma radiation obtained from a particular stratum, formation, or sample. In many instances the total amount of radiation will be the same for a plurality of strata, and yet the strata formations and samples will vary widely in their nature. It has been found desirable therefore to have more specific information about the radiation obtained from a particular geophysical specimen under observation.

The present invention is concerned with a method and apparatus of distinguishing between gamma rays emitted by various elements that are present in the formation and upon the application of this method and apparatus to geophysical prospecting by the examination of the formations themselves from the surface of the earth, or even more especially by the examination of formations below the surface of the earth through the medium of the bore hole.

An important feature of my invention consists in producing nuclear excitation in the formations adjoining a bore hole by means of an external agent such as a source of neutrons lowered into the bore hole and placed adjacent to said formations. Neutrons emitted by said source into said formations undergo numerous collisions as a result of which they slow down and eventually become captured by the target nuclei of various elements present in the formations. It is well known that each of said target nuclei upon the capture of a neutron produces a compound nucleus in a highly excited state and that this compound nucleus subsequently decays to the ground state by emitting one or more gamma ray photons. The degree of excitation of a compound nucleus depends upon the identity of the original nucleus that captured the neutron and varies roughly between 6 and 8 m. e. v. The only exception is hydrogen, which upon the neutron capture produces a compound nucleus having excitation energy of about 2.3 m. e. v.

My invention is based upon the discovery that all compound nuclei do not lose their excitation energy in the same manner and that in this connection one should consider separately the behavior of light and heavy nuclei. A light nucleus subsequent to a neutron capture decays to the ground in one single step by emitting one single gamma ray photon, the energy of said photon representing the total excitation energy of the compound nucleus. On the other hand, in case of a heavy nucleus the total excitation energy is not lost in form of a single quantum and usually several quanta are emitted simultaneously. In order to consider the behavior of a heavy nucleus, take a specific example and assume that this nucleus upon the capture of a neutron produces a compound nucleus having excitation energy of 7 m. e. v. This compound nucleus decays first to an intermediate energy state having excitation energy of 6 m. e. v. Therefore, it emits a gamma ray having energy equal to the difference of the original excitation level of 7 m. e. v. and the new excitation level of 6 m. e. v. Consequently, the photon emitted may drop to a still lower energy level having excitation of 4 m. e. v. and emits a second gamma ray having an energy of 2 m. e. v., said energy representing the difference between the previous excitation level of 6 m. e. v. and the new excitation level of 4 m. e. v. After having reached the new excitation level of 4 m. e. v., the compound nucleus may decay further to the ground level by emitting a gamma ray of 4 m. e. v. Consequently, the process of losing the excitation energy did not occur in one single step as in the case of a light element, since it took three steps for the compound nucleus to pass through two intermediate energy levels to the ground state, each of said steps being accompanied by an emission of a gamma ray. These three steps usually occur simultaneously and thus there is produced a simultaneous emission of three gamma rays in cascade having energies 1 m. e. v., 2 m. e. v., and 4 m. e. v.

It is thus apparent that one can differentiate between light and heavy nuclei present in the formation by determining their behavior upon the capture of neutrons. A light element upon the capture of a neutron emits one single gamma ray having energy representing the total excitation energy of the compound nucleus. A heavy element upon the capture of a neutron emits simultaneously in cascade two or more gamma rays the total energy of said gamma rays representing the excitation of the compound nucleus. It should be mentioned in this connection that the heavier the element the more gamma rays it emits in coincidence at the instant of the capture of a single neutron. Consequently, the number of gamma rays emitted simultaneously as a result of a neutron capture may serve as an index helping to identify the capturing element. Since the formation contains many elements, upon the irradiation of the formation by neutrons, a great number of gamma rays are produced as a result of the return of various compound nuclei to their ground states. Some of the gamma rays occur in coincidences, i. e. two or three gamma rays are emitted at the same time. These coincidences result from the presence of heavy elements and the double, triple, and quadruple coincidences are contributed by progressively heavier elements. The gamma rays that do not occur in coincidences are contributed by lighter elements present in the formation. In accordance with the present invention there is provided a method and apparatus for separately measuring double, triple, and quadruple coincidences in the gamma rays resulting from neutron radiation. By continuously performing these measurements at various depths of the bore hole one may produce logs representing individually relative quantitative variations in the lighter and heavier elements present in the formations at said various depths.

It is an object of the present invention to provide an improved method and apparatus for determining the character and relative amounts of unknown substances, particularly adjacent to the bore hole.

Further objects and advantages of the present invention will become apparent as the following description proceeds and the features of novelty which characterize the invention will be pointed out with particularity in the claims annexed to and forming part of this specification.

For further details of a specific device embodying the principles of this invention and a more complete understanding of the mode of application of the principles of this invention and the numerous advantages thereof, reference may be had to the accompanying drawing which illustrates diagrammatically a bore hole which penetrates the strata of the earth and the general arrangement for measuring coincidences resulting from the neutron irradiation of the formations at various depths within the bore hole.

Referring now to the drawing, there is schematically illustrated a drill hole 9 penetrating the formation to be explored. The bore hole is defined in the conventional manner by a tubular metallic casing designated at 10.

For the purpose of exploring the formation along the bore hole there is provided in accordance with the present invention exploratory apparatus comprising a housing 11 which is lowered into the bore hole 9 by means of a cable 12, preferably including as a part thereof suitable insulated conductors. The cable 12 has a length somewhat in excess of the depth of the bore hole to be explored and is normally wound on a drum 13 positioned above the bore hole opening. The cable 12 may be unwound from the drum 13 to lower the exploring apparatus into the bore hole 9 and may be rewound upon the drum 13 to raise the exploring apparatus.

In order to determine the depth of the exploratory apparatus within the bore hole 9 at any time, there is provided a measuring reel 14 engaging the cable 12 above the bore hole and adjusted to roll on the cable in such a manner that the number of revolutions of the reel 14 corresponds to the amount of cable which has moved past the reel in either direction. The reel 14 is mounted on a shaft 15, and rotation of the reel and consequently of the shaft 15 is transmitted through a gear box 16 to another shaft 17 which is drivingly connected to take up spool 18 for moving a photographic film 19 from a feed spool 20 to the take up spool 18.

As illustrated in the drawing, the housing of the exploratory apparatus is divided into three sections designated by numerals 21, 22 and 23 respectively. In the section 21 there is provided a solid support 24 on which is disposed a suitable source of neutrons generally designated as 25; such as, for example, a radium beryllium preparation which may be enclosed in a container of a suitable material such as glass. Instead of radium beryllium preparation, the source of neutrons may comprise for instance, a discharge tube adapted to bombard a beryllium or lithium composition with deuterons, thus causing a generation of neutrons in a manner understood by those skilled in the art. The neutron source 25 is enclosed within a jacket 26 made of a material such as lead which allows the neutron rays to pass completely, or for the great part, therethrough.

The section 22 comprises four detectors designated by numerals 30, 31, 32, and 33. Each detector is of scintillation counter type and comprises a crystal in combination with a photomultiplier. The crystals comprised in the detectors 30, 31, 32, 33 are designated by numerals 40, 41, 42, 43, respectively and the corresponding photomultipliers are designated by numerals 50, 51, 52, 53, respectively. The crystals are adapted to convert the incoming gamma rays into impulses of light which subsequently impinge upon the corresponding photomultipliers provided with a suitable voltage supply. There is thus obtained across the output terminals of each detector an electrical impulse which coincides in time with the arrival of a gamma ray photon. The crystal may be anthracene or any other substance that will emit ultra-violet light when exposed to gamma radiation such as, for instance, a 1% solution of p-terphenyl in m-xylene within a container having a window of a suitable glass which is substantially transparent to ultra-violet light. The photomultiplier has a cathode provided with photosensitive surface such as caesium, or a surface that would respond selectively only to the radiations in the ultra-violet range. In the latter case the photosensitive surface will be made of nickel, since nickel has a higher work function than caesium.

It is apparent that instead of scintillation counters, the blocks 30, 31, 32, 33 may designate any other high efficiency gamma ray counters such as crystal counters or Geiger counters of very high efficiency.

The section 23 comprises amplifiers 60, 61, 62, 63, coincidence circuits 64, 65, 66, and an anticoincidence circuit 67. The amplifiers 60, 61, 62, 63 are respectively connected to the detectors 30, 31, 32, 33. The double coincidence circuit 64 has two pairs of input terminals respectively connected to the outputs of amplifiers 60, 61 and is adapted to produce across its output terminals a current impulse whenever the current impulses delivered by the amplifiers 60, 61 occur in coincidence. The triple coincidence circuit 65 has three pairs of input terminals respectively connected to the outputs of amplifiers 60, 62, 63 and is adapted to produce across its output terminals a current impulse whenever the current impulses delivered by the amplifiers 60, 62, 63 occur in coincidence. The quadruple coincidence circuit 66 has four pairs of input terminals respectively connected to the outputs of the amplifiers 60, 61, 62, 63 and is adapted to produce across its output terminals a current impulse whenever amplifiers 60, 61, 62, 63 occur in coincidence. The anticoincidence circuit 67 has four pairs of input terminals respectively connected to the outputs of the amplifiers 60, 61, 62, 63 and is adapted to produce across its output terminals a current impulse whenever a current impulse delivered by one of the amplifiers 60, 61, 62, 63 does not coincide with any other current impulse delivered by one of said amplifiers.

The double, triple, and quadruple coincidence circuits designated by blocks 64, 65, 66 and the anticoincidence circuit 67 are well known in the art and have been described in literature. See, for instance, Curran and Craggs, "Counting Tubes," Butterworth's Scientific Publications, London, 1949, pp. 134–135.

The outputs of coincidence circuits 64, 65, 66 and of the anticoincidence circuit 67 are respectively applied to the frequency measuring networks 70, 71, 72, and 73. The frequency measuring networks are of standard construction and adapted to produce outputs representing frequencies of impulses derived from the networks 64, 65, 66, and 67, respectively. Thus the output of the frequency measuring network 70 represents the number of double coincidences, the output of 71 represents the number of triple coincidences, the output of 72 represents the number of quadruple coincidences, and the output of 73 represents the number of anticoincidences.

The outputs of frequency measuring networks 70, 71, 72, and 73 are transmitted through insulated conductors associated with the cable 12 to the top of the drill hole. These outputs are subsequently amplified in amplifiers 74, 75, 76, and 77, respectively, located above the opening to the bore hole and are connected to the galvanometer coils 78, 79, 80, and 81, respectively. The galvanometer coils have attached thereto suitable mirrors in a manner well known to those skilled in the art and are adapted to reflect beams of light derived from a source 82, thereby effectively producing on the sensitive film 19 a record comprising four traces designated as 90, 91, 92, and 93, respectively, and representing the variations of the voltages applied to the galvanometers 78, 79, 80, and 81, respectively.

It is apparent that the neutrons radiated from the source 25 into the formations undergo numerous collisions as a result of which they slow down and become eventually captured by various elements in the formation. The capture of each neutron results in an emission either of a single gamma ray in case of a light element or of two or more gamma rays simultaneously emitted if the capturing element is relatively heavy. These gamma rays produce corresponding impulses across the outputs of the detectors 50, 51, 52 and 53. The coincidence networks 64, 65, 66 are provided in order to select and detect separately those gamma rays that arrive in double, triple, and quadruple coincidences. Similarly, the anticoincidence network 67 selects and detects separately those impulses that do not form any coincidences. It is thus apparent that the frequencies of impulses derived from the network 67, 64, 65, and 66 represent respectively the relative amounts of light and progressively heavier elements present in the formations. The signals representing these frequencies are derived from the frequency measuring networks 70, 71, 72, and 73, respectively. The outputs of these networks are separately transmitted through insulated conductors associated with the cable 12 to the top of the drill hole and are separately recorded on photographic paper 19 in form of traces 90, 91, 92, and 93, respectively. Thus these traces represent the variation with respect to depth of the relative amounts of light elements present in the formation, and the traces 91, 92, 93 represent the variation in relative amounts of the progressively heavier elements.

What I claim as new and desire to secure by Letters Patent of the United States is:

1. In an apparatus for determining the character of an unknown substance, a source of neutrons aranged to radiate neutrons into said substance whereby gamma rays are emitted as a result of interaction of said neutrons with said substance, a plurality of counters in the neighborhood of said substance, each of said counters comprising a substance interacting with a different incoming gamma ray whereby an electron is ejected as a result of said interaction, and means for producing an electrical impulse in response to said electron, a coincidence circuit responsive to said impulses and producing a signal whenever a determined number of impulses individually delivered by said counters arrive in coincidence, an anticoincidence circuit responsive to said impulses and producing a signal whenever a determined number of impulses individually delivered by said counters arrive in anticoincidence, and indicators for indicating the outputs of said coincidence circuit and said anticoincidence circuit.

2. In an apparatus for determining the character of an unknown substance, a source of neutrons arranged to radiate neutrons into said substance whereby gamma rays are emitted as a result of interaction of said neutrons with said substance, a plurality of counters in the neighborhood of said substance, each of said counters comprising a substance interacting with and substantially completely absorbing an incoming gamma ray whereby an electron is ejected as a result of said interaction, and means for producing an electrical impulse in response to said electron, a first coincidence circuit responsive to said impulses and producing a signal whenever a determined number of impulses individually delivered by said counters arrive in coincidence, a second coincidence circuit responsive to said impulses and producing another signal whenever a determined but different number of impulses individually delivered by said counters arrive in coincidence, and indicators for indicating said two signals.

3. In an apparatus for the radiological logging of bore holes, a housing adapted to be lowered into a bore hole, said housing comprising a source of neutrons arranged to radiate neutrons into the formations surrounding said bore hole, whereby gamma rays are emitted as a result of interaction of said neutrons with said formation, a plurality of gamma ray counters, each of said counters comprising a substance interacting with a different incoming gamma ray whereby an electron is ejected as a result of said interaction, and means for producing an electrical impulse in response to said ejected electron, a coincidence circuit responsive to said impulses and producing a signal whenever a determined number of impulses individually delivered by said counters arrive in coincidence, an anticoincidence circuit responsive to said impulses and producing a signal whenever a determined number of impulses individually delivered by said counters arrive in anticoincidence, means for determining the depth at which said housing is lowered, and means for recording the outputs of said coincidence circuit and said anticoincidence circuit in correlation with depth.

4. In an apparatus for the radiological logging of bore holes, a housing adapted to be lowered into a bore hole, said housing comprising a source of neutrons arranged to radiate neutrons into the formation surrounding said bore hole whereby gamma rays are emitted as a result of interaction of said neutrons with said formation, a plurality of gamma ray counters, each of said counters comprising a substance interacting with and substantially completely absorbing an incoming gamma ray whereby an electron is ejected as a result of said interaction, and means for producing an electrical impulse as a result of said interaction, a first coincidence circuit responsive to said impulses and producing a signal whenever a determined number of impulses individually delivered by said counters arrive in coincidence, a second coincidence circuit responsive to said impulses and producing another signal whenever a determined but different number of impulses individually delivered by said counter arrive in coincidence, means for determining the depth at which said housing is lowered, and means for recording said two signals in correlation with depth.

5. The method of determining the nature of formations penetrated by a bore hole which comprises inserting into the bore hole a neutron emitting source, thereby exposing various elements present in said formation to the action of neutrons emitted by said source, some of said elements emitting two gamma rays as a result of interaction with a single neutron and other elements emitting simultaneously a plurality of gamma rays as a result of said interaction, separately counting the rate of arrival of two gamma rays in coincidence, and of a plurality of gamma rays in anticoincidence and measuring the depths at which said elements were exposed and recording said counts in correlation with said depth.

6. The method of determining the nature of formations penetrated by a borehole which comprises the steps of, inserting into the borehole a neutron emitting source and exposing the elements present in the formations to the action of neutrons emitted by said source, the number of gamma rays of capture simultaneously emitted by one of said elements as a result of interaction with a single neutron being indicative of the nature of said one element, detecting the occurrence of gamma rays simultaneously produced in the formation as a result of interaction with a single neutron, and counting the rate of occurrence of said detected simultaneously produced gamma rays.

7. A radioactivity well logging system, comprising a subsurface unit adapted to be lowered into a borehole, said subsurface unit including a source of neutrons arranged to radiate neutrons into the formation surrounding said borehole, whereby gamma rays of capture are produced in the formation as a result of neutron interaction therein, the number of gamma rays of capture simultaneously emitted by one of the elements of the formation being indicative of the character of said one element, a pair of gamma ray detectors of the pulse producing type in said unit, each of said detectors producing pulses in response to different gamma rays intercepted thereby, coincidence circuit means for deriving a first signal proportional to the rate of occurrence of pulses simultaneously produced by both said detectors, anticoincidence circuit means for deriving a second signal proportional to the rate of occurrence of non-coincidental pulses produced by said detectors, and means for recording said first and second signals.

8. A radioactivity well logging system, comprising a subsurface unit adapted to be lowered into a borehole, said subsurface unit including a source of neutrons arranged to radiate neutrons into the formation surrounding said borehole, whereby gamma rays of capture are produced in the formation as a result of neutron interaction therein, the number of gamma rays of capture simultaneously emitted by one of the elements of the formation being indicative of the character of said one element, means for detecting gamma rays of capture emitted singly by the formation, means for detecting gamma rays of capture simultaneously emitted by the formations in groups, means for developing a first signal proportional to the rate of occurrence of said singly emitted gamma rays and a second signal proportional to the rate of occurrence of said group emitted gamma rays, and means for recording said first and second signals.

9. A radioactivity well logging system, comprising a subsurface unit adapted to be lowered into a bore hole, said subsurface unit including a source of neutrons arranged to radiate neutrons into the formation surrounding said bore hole, whereby gamma rays of capture are produced in the formation as a result of neutron interaction therein, the number of gamma rays of capture simultaneously emitted by one of the elements of the formation being indicative of the character of said one element, a pair of radiation detectors of the pulse producing type in said unit, each of said detectors including a scintillation crystal adapted to interact with incoming radiation and to emit light impulses as a result of said interactions, each of said detectors also including means for converting the light impulses emitted by the corresponding scintillation crystal into corresponding electrical impulses, coincidence circuit means for deriving a first signal proportional to the rate of occurrence of pulses simultaneously produced by both said detectors, anticoincidence circuit means for deriving a second signal proportional to the rate of occurrence of non-coincidental pulses produced by said detectors, and means for recording said first and second signals.

10. In an apparatus for the radiological logging of bore holes, a housing adapted to be lowered into a bore hole, said housing comprising a source of neutrons arranged to radiate neutrons into the formations surrounding said bore hole, whereby gamma rays are emitted as a result of interaction of said neutrons with said formations, a plurality of radiation counters of the pulse producing type, each of said counters including a scintillation crystal adapted to interact with incoming radiation and to emit light impulses as a result of said interactions, each of said counters also including means for converting the light impulses emitted by the corresponding scintillation crystal into corresponding electrical pulses, a coincidence circuit responsive to said impulses and producing a signal whenever a determined number of impulses individually delivered by said counters arrive in coincidence, an anticoincidence circuit responsive to said impulses and producing a signal whenever a determined number of impulses individually delivered by said counters arrive in anticoincidence, means for determining the depth at which said housing is lowered, and means for recording the outputs of said coincidence circuit and said anticoincidence circuit in correlation with depth.

References Cited in the file of this patent

UNITED STATES PATENTS

| Number | Name | Date |
|---|---|---|
| 2,351,028 | Fearon | June 13, 1944 |
| 2,469,460 | Fearon | May 10, 1949 |
| 2,512,020 | Herzog | June 20, 1950 |
| 2,517,404 | Morton | Aug. 1, 1950 |
| 2,531,144 | Manley | Nov. 21, 1950 |
| 2,535,066 | Herzog | Dec. 26, 1950 |

OTHER REFERENCES

Radioactivity and Nuclear Physics, by James M. Cork, 2nd ed., June 1950, Van Nostrand Co., pages 58–59.